INVENTOR.
JAMES W. CASPERS

Feb. 26, 1963  J. W. CASPERS  3,079,599
AURAL DETECTION SYSTEM
Filed Aug. 7, 1961  3 Sheets-Sheet 2

INVENTOR.
JAMES W. CASPERS
BY
ATTORNEYS

Feb. 26, 1963   J. W. CASPERS   3,079,599
AURAL DETECTION SYSTEM
Filed Aug. 7, 1961   3 Sheets-Sheet 3

INVENTOR.
JAMES W. CASPERS
BY
ATTORNEYS 3,079,599
AURAL DETECTION SYSTEM
James W. Caspers, 5014 August St., San Diego 10, Calif.
Filed Aug. 7, 1961, Ser. No. 129,910
9 Claims. (Cl. 343—7.3)
(Granted under Title 35, U.S. Code (1952), sec. 266)

The invention described herein may be manufactured and used by or for the Government of the United States of America for governmental purposes without the payment of any royalties thereon or therefor.

This invention relates to systems for detecting moving objects through the reception of signals reflected therefrom, and more particularly, to an aural detection system for detecting moving objects, and specifically to a gated video demodulator system for use with an echo ranging system.

As is well known, the frequency of the echo from a target having radio velocity relative to a radar transmitter differs from the frequency of the transmitted pulse due to the Doppler effect, whereas the frequency from the echo of a target having no radio velocity shows no frequency change. Prior systems have attempted to detect moving targets through the use of an MTI (Moving Target Indication) radar system wherein echo pulses received from both stationary and moving targets are applied to a receiver along with the transmitted frequency, and the echo pulses received from stationary targets cancelled out. In other systems, the echo pulses with their frequencies reduced by beating with the local oscillator are applied to the radar receiver along with the continuous wave reference signal derived from a coherent oscillator locked in phase with the transmitted frequency similarly reduced by beating with the same local oscillator, in the resulting video output of the receiver, called the coherent video. Successive echo pulses representing a stationary target do not vary in amplitude whereas successive pulses representing a moving target vary in amplitude at the Doppler frequency. MTI radar systems take advantage of this fact to distinguish the echoes of stationary and moving targets, and in most systems, to eliminate the fixed target echoes from the coherent video so that the remaining video signal represents only targets having radial motion relative to the transmitter. The elimination of the stationary target echoes from the coherent video signal requires a cancellation circuit which must be very efficient, i.e., must have a cancellation ratio of the order of minus 40 db.

In addition, in the MTI systems, accurate phase coherence between each transmission and the direct reference signal to the receiver must be maintained because the Doppler shift of the carrier frequency (and it is, of course, this shift which is relied upon for moving targets selection and indication and also for target velocity measurement per se) is determined by beating echo signals with the direct reference signal. This direct reference signal may be provided either by a local oscillator phase locked to each transmission or by a low powered C.W. oscillator which is pulse amplified to provide the pulse transmissions. If any frequency modulation occurs during transmission of the pulse a spreading of the Doppler spectrum from moving targets will occur and, moreover, will cause the receiver to produce spurious Doppler notes from fixed targets, i.e., beat notes of finite frequency. It is therefore, in practice, most difficult to maintain good phase coherence between the direct reference signal and a transmitted pulse in a pulse system and to avoid quite substantial frequency modulation during each pulse.

In other MTI systems a discrimination technique is used to distinguish between true returns from moving targets and clutter from stationary objects such as the ground. This discrimination is done by filtering techniques which eliminate the ground clutter. The received signals arriving at the radar set are at radio frequency plus or minus a Doppler shift in frequency. The Doppler shift is a very small percentage of the frequency of the transmitted signal; and consequently, it is extremely difficult to provide filters which will discriminate between moving and stationary target returns.

Another type of moving target indicator relied upon produced an audio note derived from the video information contained in the returned pulse as distinguishing between ground clutter and the aforesaid moving target. However, this system was inferior to normal radar techniques, i.e., the visual reproduction of video information on an "A" scope, due to an extremely low signal to noise ratio wherein by observing the "A" scope a target could be observed but could not be heard due to the noise derived from background clutter. In addition, the systems could only be used at extremely short range due to the aforesaid low signal-to-noise ratio.

Additionally, in a pulse Doppler radar system of the type described above, spurious signals arise from many sources, aggravated by the large number of mixers used in such systems. The most serious of these are caused by video harmonics of the pulse repetition frequency, the video harmonics of the range gates, and the harmonics of the pulse repetition frequency near the transmitter frequency. These spurious signals will appear in the output audio tone and will mask the moving target unless effectively removed thus rendering the above system inoperative.

An object of the present invention is to provide a detection system for aurally detecting moving objects.

Another object of the invention is to eliminate spurious signals appearing in the received video signal of a radio detection and ranging system.

An additional object of the invention is to provide an aural detection system for detecting targets which produce a Doppler shift in frequency of a received radar signal.

Another object of the invention is to provide a simple and effective system for utilizing the Doppler effect to distinguish between objects having different radial velocities.

Another object of the invention is to provide an aural detection system which may be utilized in conjunction with a noncoherent radar system.

A further object of the invention is to provide an aural detection system for detecting moving targets having a high signal to noise ratio.

A further object of the invention is to provide an aural detection system to distinguish between objects having different radial velocities at relatively long ranges.

Another object is to provide a gated video demodulator which may be used in conjunction with existing pulse type echo distance-measuring systems.

Another object is to provide a velocity-sensitive echo-detecting system involving simpler and more dependable apparatus having fewer critical components than prior systems.

A further object of the invention is to provide an aural detection system for detecting targets which are masked by ground clutter and cannot be detected on the radar scope.

Various other objects and advantages will appear in the following description of an embodiment of the invention and the novel features will be particularly pointed out hereinafter in connection with the appended claims.

The above objects and advantages of the present invention are obtained through the use of a system which enables the radar operator to listen to audio sounds which are derived from amplitude fluctuations received from a selected target or range element being searched. The system demodulates or detects video and produces an audio sound which depends on the nature of the particular portion of the video signal being examined.

The present invention's purpose is to assist the radar operator in detecting small moving targets which are quite often undetected on the radar scope since their presence is masked by strong clutter returns. In the illustrative embodiment the unit demodulates or detects a gated video and produces an audio sound which depends on the nature of the particular portion of the video signal which passes through the gate.

The radar echo is generally a fluctuating or modulated signal, which modulation can result from the relative motion of the scatterers which produce the echo from an area-extensive target. Modulation of the radar echo is caused by even the slightest movement of grass, trees and foliage or the movement of animals, trucks, vehicles, etc.

Ground clutter modulation is a random fluctuation which consists chiefly of very low frequency components and is caused by a random movement of a relatively large number of scatterers. In the present invention, ground clutter modulation causes a low pitched noise to be heard in the reproducing or audio output.

In contrast to the random motion of scatterers, a constant radial velocity difference between two or more scatterers results in a pulse having a periodic modulation which produces a tone having a definite pitch. The frequency of the modulation is given by the equation $f_d = 34.3V$ where $f_d$ is the Doppler frequency in c.p.s., and V is the relative radial velocity in knots, where the radar wave length is assumed to be 3 cm. A moving vehicle can fulfill the condition for a constant radial velocity for example, and in the presence of ground clutter for phase reference, a tone is produced in the audio output.

Discrimination between moving targets and ground clutter is made by means of the audio signal in that clutter returns produce a low frequency noise while a moving target produces a tone having a pitch determined by its radial velocity. However, in the case of a moving target the tone will be accompanied by the low frequency clutter noise, and detection depends upon the discrimination between the two. Fortunately, the human ear is quite proficient in discriminations of this type.

Figure 1:
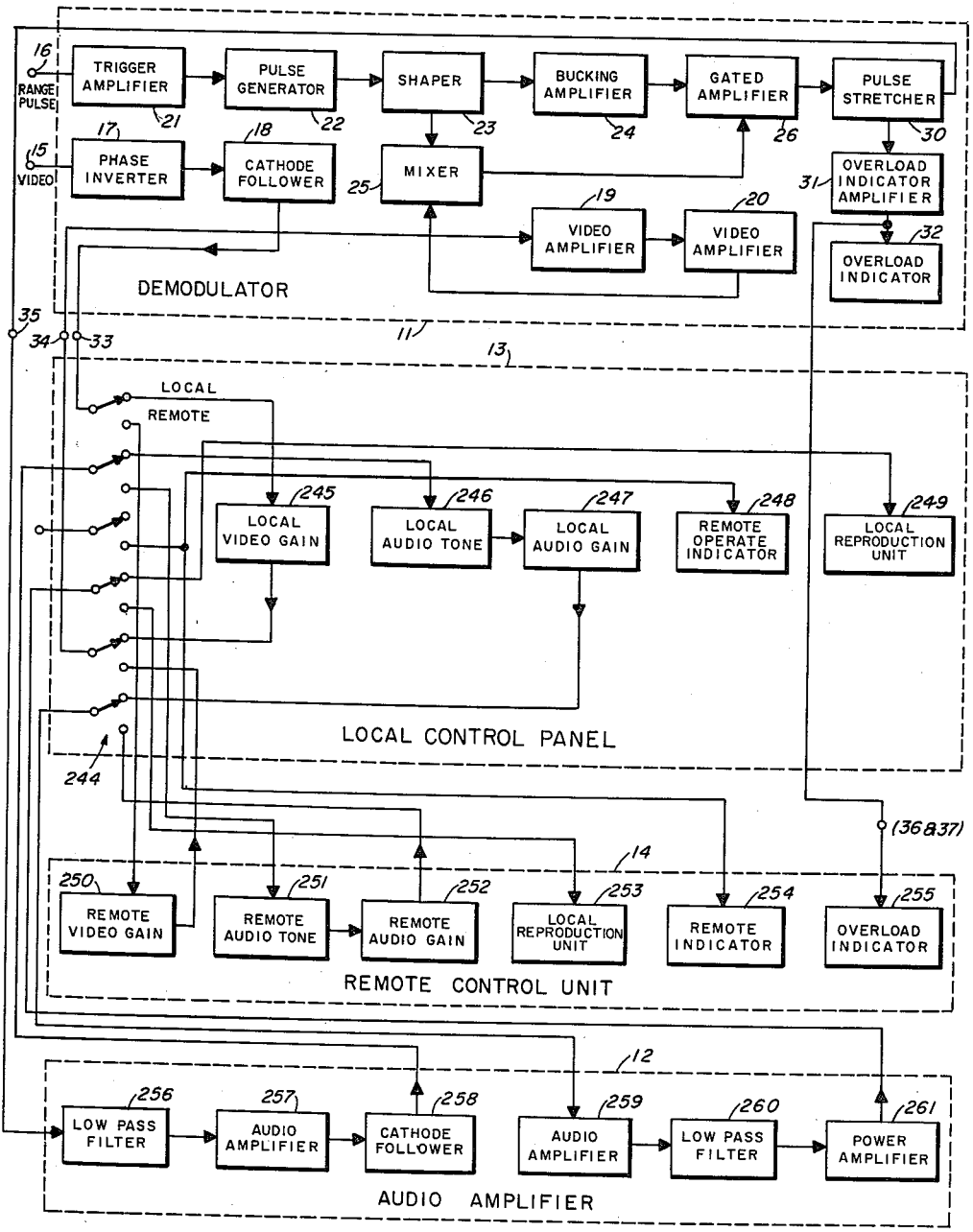
FIG. 1 is a simplified block diagram of an illustrative embodiment of the present invention.

The embodiment of the inventtion as set forth in FIG. 1 comprises a demodulator 11, audio amplifier 12, local control panel 13 and remote control unit 14. The demodulator 11 is set forth in detail in FIG. 2 wherein a pair of input terminals 15 and 16 are provided for coupling video information and a range pulse from a receiver of the regular radar system, respectively.

The portion of the demodulator which treats the video signal comprises a phase inverter 17, cathode follower section 18, video amplifier 19, and video amplifier 20. The portion of the demodulator which treats the range pulse comprises a trigger amplifier 21, pluse generator 22, pulse shaper 23, and bucking amplifier 24. The range pulse and video information are mixed in a mixer 25 and the output signal from the mixer 25 is coupled to gated amplifier 26. The gated amplifier is operatively coupled to a pulse stretcher 30 comprising tubes 27, 28, and 29. An overload indicator amplifier 31 and overload indicator 32 are operatively coupled to pulse stretcher 30 for providing an indication when the receiver or the video information is being limited. Terminals 33, 34, 35, 36, 37, 38, 39, 40, 41, and 42 are provided for coupling signals to and from the local control panel 13, remote control unit 14, and audio amplifier 12 so that the desired interconnections between units may be provided.

The phase inverter 17 of the video section of the demodulator unit comprises a pentode having an indirectly heated cathode 43, control grid 44, screen grid 45, suppressor grid 46 and plate 47. Connected between input terminal 15 and control grid 44 is a coupling capacitor 48 which couples the video signal to the control grid of the phase inverter 17. Grid leak resistor 49 is connected between the control grid and ground to prevent blocking and cut-off of the tube. Cathode 43 is heated by filament 50 and suppressor grid 46 is connected directly to the cathode 43 as is common. Bias is provided on the tube through a resistor 51 connected between the cathode and ground while decoupling is provided on the cathode through capacitors 52 and 53. The two capacitors are used in that a substantially complete decoupling is required so that a high frequency and low frequency decoupling capacitor is provided. B-plus from input terminal 39 is coupled through screen dropping resistor 54 to screen grid 45. Decoupling on the screen grid is provided through a capacitor 55 connected between srceen grid 45 and cathode 43. High voltage is provided at the plate 47 from input terminal 39 through plate dropping resistor 56 and plate load resistor 57. Decoupling is accomplished through decoupling capacitor 58 connected between the common point of resistors 56 and 57 and ground.

A coupling capacitor 59 is connected between plate 47 and one side of a resistor 60 for coupling the signal appearing at the plate 47 to the cathode follower 18. Resistor 60 forms one element of an attenuator network comprising capacitor 61 connected in parallel with resistor 60 and resistor 62. Another coupling capacitor 63 is provided between the other side of resistor 60 and a control grid 262 of cathode follower 18. The resistor 62 forming one portion of the attenuator network is connected between the common point of resistor 60 coupling capacitor 63 and ground. D.C. restoration is provided at the control grid 262 of cathode follower 18 from input terminal 40 through resistor 62 and germanium diode 263 connected across resistor 265, both of which are connected to the control grid 262. A decoupling capacitor 64 is connected between the common side of diode 263, resistor 265, input terminal 40, and ground. A heater 65 heats a cathode 66 in the cathode follower 18. B plus is provided at plate 67 from terminal 39 through plate load resistor 68 and decoupling is accomplished through decoupling capacitor 69 connected between plate 67 and ground. The output signal is developed across cathode resistor 70 connected between cathode 66 and ground and the signal appears at terminal 33.

The video amplifier 19 comprises a pentode having an indirectly heated cathode 71, control grid 72, screen grid 73, suppresser grid 74, and plate 75. Filaments 76 heat the indirectly heated cathode 71. The video signal appearing on terminal 34 is coupled through coupling capacitor 77 to the control grid 72. To prevent blocking grid leak resistor 78 is provided between the control grid 72 and ground. Bias is derived for the tube through cathode resistor 79 connected between cathode 71 and ground and decoupling at the cathode is provided through high frequency decoupling capacitor 80 and low frequency decoupling capacitor 81 both of which are connected between cathode and ground. B plus is supplied at the screen 73 from input terminal 39 through dropping resistor 82 and screen dropping resistor 83. Decoupling is provided at the screen through decoupling capacitors 84 and 85 connected between the screen grid 73 and cathode 71. Further decoupling is provided for the B plus through decoupling capacitor 86 connected at the common point of resistors 82, 83 and ground. B plus is supplied at plate 75 of video amplifier 19 through the aforesaid resistor 82, plate dropping resistor 87, compensating coil 89, and compensating coil 90 and plate load resistor 91 connected in parallel.

The second video amplifier 20 is another pentode comprising heater 92 cathode 93, control grid 94, screen grid 95, suppresser grid 96, and plate 97. The suppresser 96 is connected to cathode 93 and thence directly to ground. The signal developed across the plate load comprising resistor 91 and compensating coil 90 of the previous stage is coupled through a coupling capacitor 98 to control grid 94. The signal is developed across grid resistor 99 connected between control grid 94 and ground and D.C. restoration is supplied to the control grid 94 through the germanium diode 100. Screen voltage is applied to screen grid 95 through the aforesaid resistor 82 and screen dropping resistor 101. Decoupling at the screen is accomplished through decoupling capacitor 102 connected between screen grid 95 and ground. B plus is applied to plate 97 from one side of resistor 82 through dropping resistor 103, compensating coil 104, and compensating coil 105 and plate load resistor 106 connected in parallel.

Mixer tube 25 comprises a duodiode having a heater 107, cathodes 108, 109, control grids 110, 111, and plates 112, 113 which are connected together. The signal appearing across compensating coil 105 and plate load resistor 106 of the previous video amplifier 20 is coupled through coupling capacitor 114 to control grid 110 of the mixer 25. Grid leak resistor 115 is provided to prevent blocking of the first section of the tube and is connected between control grid 110 and ground. Bias for the first section of the tube is supplied through resistor 116 connected between cathode 108 and ground and decoupling at the cathode is accomplished through high frequency by-pass capacitor 117 and low frequency by-pass capacitor 118 both of which are connected between cathode 108 and ground. B plus is supplied from input terminal 39 to the common plates 112 and 113 through dropping resistor 119, plate load resistor 120, and compensating coil 121. Decoupling at the plates is accomplished through a by-pass capacitor 122 connected at the common point of resistors 119, 120 and ground.

In the trigger section or range section of the demodulator unit, the range pulse appearing at input terminal 16 is coupled through coupling capacitor 264 to a control grid 123 of trigger amplifier 21. The other elements of trigger amplifier 21 comprise indirectly heated cathode 124 and plate 125. Grid lead resistor 126 is connected between control grid 123 and ground while cathode 124 is directly grounded. B plus is supplied at plate 125 from input terminal 39 through dropping resistor 127 and plate load resistor 128 while decoupling at the plate is accomplished through by-pass capacitor 129 connected between the common point of resistors 127, 128 and ground.

The pulse generator 22 comprises a gas tetrode which has an indirectly heated cathode 130, heater 131, control grid 132, screen grid 133, and plate 134. The screen grid 133 and control grid 132 are connected directly together and the signal appearing at plate 125 of the trigger amplifier 21 is coupled through coupling capacitor 135 directly to the control grid. Resistor 136 is connected between the control grid and the movable arm 137 of a bias-adjust potentiometer 138 which is connected between cathode 130 and ground. Decoupling at the cathode is accomplished through by-pass capacitor 139 connected between cathode 130 and ground. B plus is coupled through plate load resistor 140 to plate 134 and is also supplied at the common end of bias potentiometer 138 and cathode 130 through dropping resistor 141.

Shaper 23 comprises a dual triode having a heater 142, cathodes 143, 144, control grids 145, 146, and plates 147, 148. The signal appearing at the plate 134 of pulse generator 22 is coupled through coupling capacitor 149 and is developed across a fixed resistor 150 and potentiometer 151 connected in parallel and connected between one side of coupling capacitor 149 and ground.

An arm 152 of potentiometer 151 is connected to control grid 145 and the signal developed across the resistors 150 and potentiometer 151 thus appears at the control grid 145. Bias is provided on the first section of the pulse shaper through resistor 153 connected between cathode 143 and ground and decoupling at the cathode is accomplished through by-pass capacitor 154 connected across resistor 153. B plus is supplied to plate 147 through plate load resistor 155 while B plus is supplied to plate 148 through plate load resistor 156 and compensating coil 157. The signal appearing at the plate 147 of the first section of the pulse shaper is coupled through coupling capacitor 158 to control grid 146 and the signal is developed across grid lead resistors 159 and 160. Resistor 159 is connected between grid 146 and ground while resistor 160 is connected between the control grid 146 and cathode 144. Bias is supplied to the second section of the pulse shaper 23 through cathode resistor 161 and decoupling at the cathode is accomplished through by-pass capacitor 162 connected across cathode resistor 161.

Bucking amplifier 24 comprises one-half of a duotriode and has an indirectly heated cathode 163, heater 164, control grid 165, and plate 166. The signal appearing at the plate 148 of the pulse shaper 23 is coupled through coupling capacitor 167 to grid 165. The signal is developed across grid lead resistor 168 which is connected between control grid 165 and the movable arm 169 of potentiometer 170. Potentiometer 170 is connected between cathode 163 and ground and sets the current value in the bucking amplifier. Fixed resistor 171 is also connected between cathode 163 and ground to provide fixed bias while decoupling at the cathode is accomplished through by-pass capacitor 172 connected across resistor 171.

Now, referring back to the second half of mixer 25, the signal appearing at plate 148 of pulse shaper 23 is also coupled through coupling capacitor 173 to control grid 111 of mixer 25. Grid resistor 174 is connected between control grid 111 and the arm 175 of a potentiometer 176 which is connected between cathode and ground. The function of potentiometer 176 will be subsequently explained in the operation of the complete system. Decoupling is accomplished at the cathode 109 through by-pass capacitor 177 connected across potentiometer 176.

The gated amplifier 26 is a pentode having an indirectly heated cathode 178, heater element 179, control grid 180, screen grid 181, plate 182, and suppresser grid 183 which is connected directly to cathode 178. The combined range and video signal appearing at the output, i.e., plate 113 of mixer 25 is coupled through a coupling capacitor 184 to grid 180 of the gated amplifier 26 and is developed across grid resistor 185 connected between control grid 180 and ground. Screen voltage is applied to screen grid 181 from the B plus supply through dropping resistor 186 and decoupling at the screen grid is accomplished through by-pass capacitor 187 connected between screen grid 181 and ground. The bias network for gated amplifier 26 comprises the aforementioned resistor 186, resistor 188, one side of which is connected to screen grid 181 and the other side to cathode 178, and in addition resistor 189 which is connected between cathode 178 and ground. Decoupling at the cathode is accomplished through by-pass capacitor 190 connected between cathode and ground. B-plus for plate 182 is supplied from input terminal 39 through plate load resistor 191 and decoupling at the plate is accomplished through by-pass capacitor 192 connected across resistor 191. In addition, the plate 166 of bucking amplifier 24 is connected directly to plate 182 of the gated amplifier 26 for a purpose which will be subsequently explained in the operation of the complete system.

As mentioned previously the stretcher at 30 comprises the second half of a duotriode 27, a duodiode 28, and a second duotriode 29. The triode 27 comprises a heater 164 associated with the bucking amplifier 24, cathode 193, control grid 194, and plate 195. Plate voltage is supplied to plate 195 from input terminal 39 through plate dropping resistor 196 and decoupling at the plate is accomplished through by-pass capacitor 197 connected between plate 195 and ground. The triode 27 is connected as a cathode follower and the output signal is developed across cathode resistor 198 connected between cathode 193 and ground.

The signal appearing at plate 182 of the gated amplifier 26 is coupled through coupling capacitor 199 to the grid 194 of tube 27 and is developed across grid resistor 200 connected between control grid 194 and ground.

The duodiode 28 comprises a heater 201, indirectly heated cathodes 202, 203, and plates 204, 205. The signal appearing at the cathode of cathode follower 27 is coupled through coupling capacitor 206 to the plate 205 of the duodiode. A capacitor 207 is connected between plate 205 and 204 through tube 28 and a discharge path for the capacitor is provided through potentiometer 208 connected between plate 204 and ground and resistor 209 connected between plate 205 and ground. The adjustable arm 210 of potentiometer is connected directly to ground.

Duotriode 29 comprises a heater 211, indirectly heated cathodes 212, 213, control grids 214, 215, and plates 216, 217. The cathode 203 of the prior stage 28 is connected directly to grid 215 of the duotriode 29 and a capacitor 218 is connected between control grid 215 and ground. A current limiting resistor 219 is connected between control grid 214 of stage 29 and plate 204 of the prior stage 28. A capacitor 220 is connected between plate 217 and control grid 214 and B-plus from input terminal 39 is supplied to plate 217 through plate dropping resistor 221. The output signal is developed across a resistor 222 connected between cathode 213 and ground and appears at output terminal 35 and is also coupled through coupling capacitor 223 to overload indicator amplifier 31.

The overload indicator amplifier 31 comprises a duotriode which has indirectly heated cathodes 224, 225, heater element 226, control grids 227, 228 and plates 229, 230. The signal is coupled through coupling capacitor 223 from stage 29 to grid 227. The signal is developed across grid resistor 231 connected between control grid 227 and arm 232 of potentiometer 233 which is connected between cathode 224 and ground. Decoupling at cathode 224 is accomplished through by-pass capacitor 234 connected between cathode 224 and ground. Plate potential is applied at plate 229 through plate load resistor 235 and B-plus is also applied through a large dropping resistor 236 to cathode 224. The signal appearing at plate 229 is coupled through capacitor 237 to grid 228 and the signal is developed across grid resistor 238 connected between control grid 228 and ground. Cathode 225 is directly grounded. B-plus is applied to plate 230 through plate load resistor 239.

The overload indicator 32 is a neon bulb which is connected at one side to cathode 224 of the overload indicator amplifier and connected at the other side through resistor 240 to plate 230 of the overload indicator amplifier. The signal appearing at plate 230 of the overload indicator amplifier is also coupled through resistor 241 to output terminal 36 for control at the remote indicator. The other side of indicator light 32 which is coupled to cathode 224 of the overload indicator amplifier is connected to terminal 37 which also goes to the remote indicator. Filament voltage for the filaments of the tubes is supplied through input terminals 41 and 42 to the primary of filament transformer 242. The secondary of filament transformer 242 is center tapped and the center tap is connected through a by-pass capacitor 243 to ground.

Referring back to FIG. 1 which represents the system as a whole, the local control panel 13 comprises a local remote switch 244; local video gain control 245 which is merely a step attenuator providing a range of 30 db attenuation in 3 db steps; a local audio tone control 246 comprising a conventional capacitor and resistor network which is not shown; a local audio gain 247 comprising a conventional potentiometer gain control which adjusts the gain of the audio amplifier; a remote operate indicator light 248; and an audio reproduction unit 249.

The remote control unit 14 comprises a remote video gain 250 which is the equivalent of the local video gain 245; a remote audio tone control 251 which is the equivalent of local audio tone control 246; remote audio gain control 252 which is the equivalent of local audio gain control 247; and a remote reproduction unit 253 which is the equivalent of local reproduction unit 249. In addition, there is also a remote indicator 254 which is the equivalent of the remote operate indicator 248 and an overload indicator 255 which is the equivalent of the overload indicator 32.

The audio amplifier consists of conventional components and comprises a low-pass filter 256, an audio amplifier 257, a cathode follower 258, another audio amplifier 259, another low-pass filter 260, and the final power amplifier 261. The low-pass filters are designed to accomplish a filtering out of the p.r.f. frequencies and harmonics thereof which may be coupled into the audio amplifier 12. The low-pass filter 256 in the embodiment of the invention illustrated has a cut-off frequency of 1400 c.p.s. and rejects the 2 kc. p.r.f. and harmonics thereof and passes the modulation signals. The second filter 260 is provided to eliminate any p.r.f. components and harmonics thereof which may pass through the first low-pass filter 256.

*Operation*

The basic functions of the gated video demodulator system consists of two major operations, one of which is selection or gating of the desired video signal and the other of which comprises conversion of this gated video into an audio signal.

Briefly, the desired video signal is separated from the ungated video signal by means of gated video amplifier 26. This gating action is initiated by the range pulse from the radar receiver. Thus, the range pulse on the "A" scope indicates the monitored range. Gating the video eliminates the influence of targets and clutter at all other ranges.

In operation, the gating amplifier 26 is normally biased below cut-off. No signal appears on the plate of the gated amplifier 26 since the control grid 180 is driven with a negative going video signal. A positive pedestal of variable duration, ¼ to 1¼ microsecond, is applied to the control grid 180 along with the video signal. During the pedestal, the grid is driven above the cut-off point and the gated amplifier amplifies the video signal. The pedestal is initiated by the range pulse coupled into terminal 16 from the radar receiver and thus a video signal from various ranges may be selected.

The selected video signal is next converted into an audio signal in the pulse stretcher 30 which detects, filters, and amplifies the output of the gated amplifier. The objective is quite similar to the detection of an amplitude modulated carrier, however, the technique is modified. Stages 27, 28 and 29 comprise the pulse stretcher 30 which stretches the gated video pulse from the gated amplifier. The stretching operation which lengthens the gated pulse, approximately one-microsecond to several hundred microseconds, provides a large power gain and the demodulation.

In a detailed description of the circuit operation a negative range pulse from the radar receiver is coupled to the demodulator unit at terminal 16 and applied to grid 12 of trigger amplifier 21. The trigger amplifier amplifies, clips, and inverts the range pulse which is then applied to grid 132 of the pulse generator 22.

The pulse generator 22 is a gas tetrode which is normally biased in a non-conduction condition. Bias on the tube is adjusted by potentiometer 137 and through the operation of the circuit capacitor 149 is charged to approximately 300 volts until the positive pulse from the preceding trigger amplifier is applied to the grids of the pulse generator 22.

The positive pulse causes the gas tube to fire and discharge capacitor 149 through fixed resistor 150 and potentiometer 151 which are connected in parallel. The RC time constant is quite small and hence, a short duration negative pulse is developed across the potentiometer 151. After the capacitor 149 discharges, the gas tube de-ionizes and the capacitor charges slowly to B-plus through resistor 140 and the parallel discharge resistors 150 and 151. This charging process is complete when the next range pulse, about 500 microseconds later is applied. At each successive range pulse the foregoing process is repeated and a train of sharp negative pulses is generated at the output of the pulse generator 22.

The amplitude of the negative pulses which are next applied to the grid 145 of pulse shaper 23 is adjusted through the adjustment of potentiometer 151. This first portion of pulse shaper 23 is normally conducting and it is cut off by a negative pulse applied to grid 145. Since the negative pulses are formed by an RC discharge, the trailing edge is sloped and, thus potentiometer 151 which controls the pulse amplitude also controls the duration of the cut-off time for the pulse shaper 23. Increasing the amplitude of the negative pulse increases the cut-off time. Therefore, a positive pulse of variable width is developed on plate 147 of pulse shaper 23. This positive pulse on plate 147 is then shaped and inverted by the second half of pulse shaper 23 thereby resulting in a negative going rectangular pulse of variable width and constant amplitude.

The negative pulse output from the plate 148 of the pulse shaper 23 drives both the bucking amplifier 24 and mixer 25. It is convenient to consider the operation of the mixer first after which the function of the bucking amplifier 24 is more easily explained and is more apparent.

The video portion of the signal is coupled from input terminal 15 to grid 44 of the phase inverter 17 where phase inversion takes place. The inverted signal is then coupled through cathode follower 18 to the local control panel 13 at terminal 33. Depending on the switch position, i.e., whether in local or remote, the video signal then either goes through the local video gain control 245 or the remote video gain control 259. However, whether the signal goes through the video gain control 245 or video gain control 259 is immaterial in that the same action may be accomplished in either one, i.e., a control of the video gain. After passing through the gain control the video is then coupled to input terminal 34 on the demodulator chassis and thence coupled to grid 72 of the first video amplifier 19 wherein the video signal is amplified and appears in the plate circuit of the video amplifier. The signal is next coupled to grid 94 of the second video amplifier 20 for further amplification.

The amplified video signal from the second amplifier 20 and the negative pulse from the pulse shaper 23 are mixed in the mixer 25. The first half of the mixer 25 comprising plate 112, control grid 110, and cathode 108 is driven by the video signal and the second half of the mixer tube comprising plate 113, control grid 111, and cathode 109 is driven by the negative pulse from the pulse shaper. Mixing occurs in the common plate circuit comprising plates 112, 113 and the mixed signal is applied to the control grid 180 of the gated amplifier 26.

Thus a signal comprising negative going video and a positive pedestal of adjustable width and amplitude appears on the grid 180 of gated amplifier 26. The width of the pedestal is adjusted by the previously discussed control potentiometer 151, and the amplitude by potentiometer 176 in the cathode circuit of the mixer stage 25.

Pedestal amplitude is adjusted so that the positive pedestal drives the grid 180 of the gated amplifier out of the cut-off region. Cut-off bias is established by the network consisting of resistors 186, 188 and 189 which plates the cathode at approximately 25 volts. Therefore, if the pedestal amplitude is about 23 volts then the video signal riding on the pedestal will pass through the gated amplifier and be amplified therein.

Both amplified and inverted video and pedestal voltages appear at plate 182 of the gated amplifier 26. The pedestal portion of this signal is bucked out by the bucking amplifier 24 in the following fashion. The bucking amplifier normally draws a quiescent current equal to the gated current of the gated amplifier 26. This current value is set by potentiometer 169 in the cathode circuit of the bucking amplifier 24. When the gated amplifier is activated by the pedestal appearing on the grid 180 thereof, the bucking amplifier is cut-off. Therefore, the gating action merely causes a switching of current from the bucking amplifier 24 to the gated amplifier 26 with the result that the gating action causes no change of current in the plate load resistor 191 in the plate circuit of the gated amplifier 26. However, the bucking amplifier 24 does not buck out the gated video pulse which appears on the plate 182 of gated amplifier 26.

The gated video pulse appearing at plate 182 of the gated amplifier 26 is a positive pulse having an amplitude proportional to the video coincident with the pedestal. In addition, the amplitude of this output pulse depends upon the average video amplitude during the gain. This averaging is performed by the integrating capacitor 192, in the plate load of the gated amplifier 26. Integration is necessary for the wide gate operation where several pulses may fall within the gate established. Without integration the following circuits would operate on the largest signal within the gate and this would be unsatisfactory since the largest signal may be clutter return while one of the smaller signal returns may be a moving target.

The gated video from the gated amplifier 26 is stretched in the pulse stretcher 30 in that the average power output from the gated amplifier is quite low because of the low duty factor. Pulse stretching, however, increases the duty factor and consequently results in a large power gain. This action is performed by tubes 27, 28 and 29.

Stage 27 serves as a cathode follower for driving the remainder of the stretcher circuit. The positive video pulse from the gated amplifier passes through the cathode follower 27 and charges capacitors 218 and 207 through both sections of tube 28. The capacitor voltages are determined by the amplitude of the video pulse. These capacitors remain charged after the pulse stops and until the following cycle is complete. Capacitor 218 increases the voltage on the grid 215 of the tube 29 and causes the cathode voltage appearing at cathode 213 to increase and this is the leading portion of the stretch pulse output. Capacitor 218 has no discharge path during this time in that its discharge path is normally through the first half of tube 29 which is now biased to cut-off by the voltage on capacitors 207 and 220. Capacitor 207 has a discharge path through resistor 209 and potentiometer 208 and thus, capacitor 207 slowly discharges until the bias is reduced on control grid 214 of tube 29 and this section starts to conduct. Capacitor 218 then discharges through the first half of tube 29 and the stretched pulse is ended. Potentiometer 208 adjusts the duration of the output pulse through the adjusting of the discharge time of capacitor 207. Resistor 221 and capacitor 220 provide positive feedback to reduce the discharge time of capacitor 218 and thereby steepen the trailing edge of the stretched pulse.

Thusly, the pulse stretcher 30 produces a pulse having an amplitude proportional to the gated video amplitude but several hundred times as great in duration. Furthermore, the pulse stretcher serves as a detector and the desired audio frequency components are present in the stretched pulse.

The stretched pulse is then coupled through terminal 35 to the low-pass filter 256 in the audio amplifier 12 and is also coupled to grid 227 of the overload indicator amplifier 31.

Overload indicator amplifier indicates limiting in the system which may cause loss of signal. The overload is indicated by the glowing of the neon overload indicators 32 and 255 on the demodulator 11 and remote control unit 14 respectively. Glow starts at a signal level predetermined by the setting of potentiometer 233 in the cathode circuit of cathode 224 of the overload indicator amplifier 31 which is normally set for an indication somewhat below the limiting level.

The audio amplifier 12 functions to amplify and filter the pulse stretcher output in order to produce an audible sound in the audio reproduction units 249 and 253, respectively. This is accomplished in a relatively concise and simple manner.

The signal introduced into low-pass filter 256 contains the audio frequency voltages resulting from target modulation plus the p.r.f. and its harmonics. The filter 256 is a low-pass filter having a cut-off frequency of 1400 c.p.s. and thus rejects the 2 kc. p.r.f. and its harmonics but passes the modulation signal. The audio voltage is then coupled into audio amplifier 257 for amplification and then to cathode follower 258. The output of the cathode follower is coupled to the local control panel and then depending on the position of the local-remote switch, to either the local or remote audio gain control 247 or 252 respectively. In either case, the audio signal is coupled ultimately to audio amplifier 259, further amplified therein. The output of the audio amplifier 259 is then passed through another low-pass filter 260 which is used to eliminate any p.r.f. components which may leak through the previous filter 256 and the other system components of audio amplifier 12.

The output of the second low-pass filter 260 drives a grid-screen coupled push-pull audio power amplifier and the resultant output signal is introduced into the local control panel and from thence depending on the position of the local remote switch 244 to either the local or remote audio reproduction units.

Figure 2:
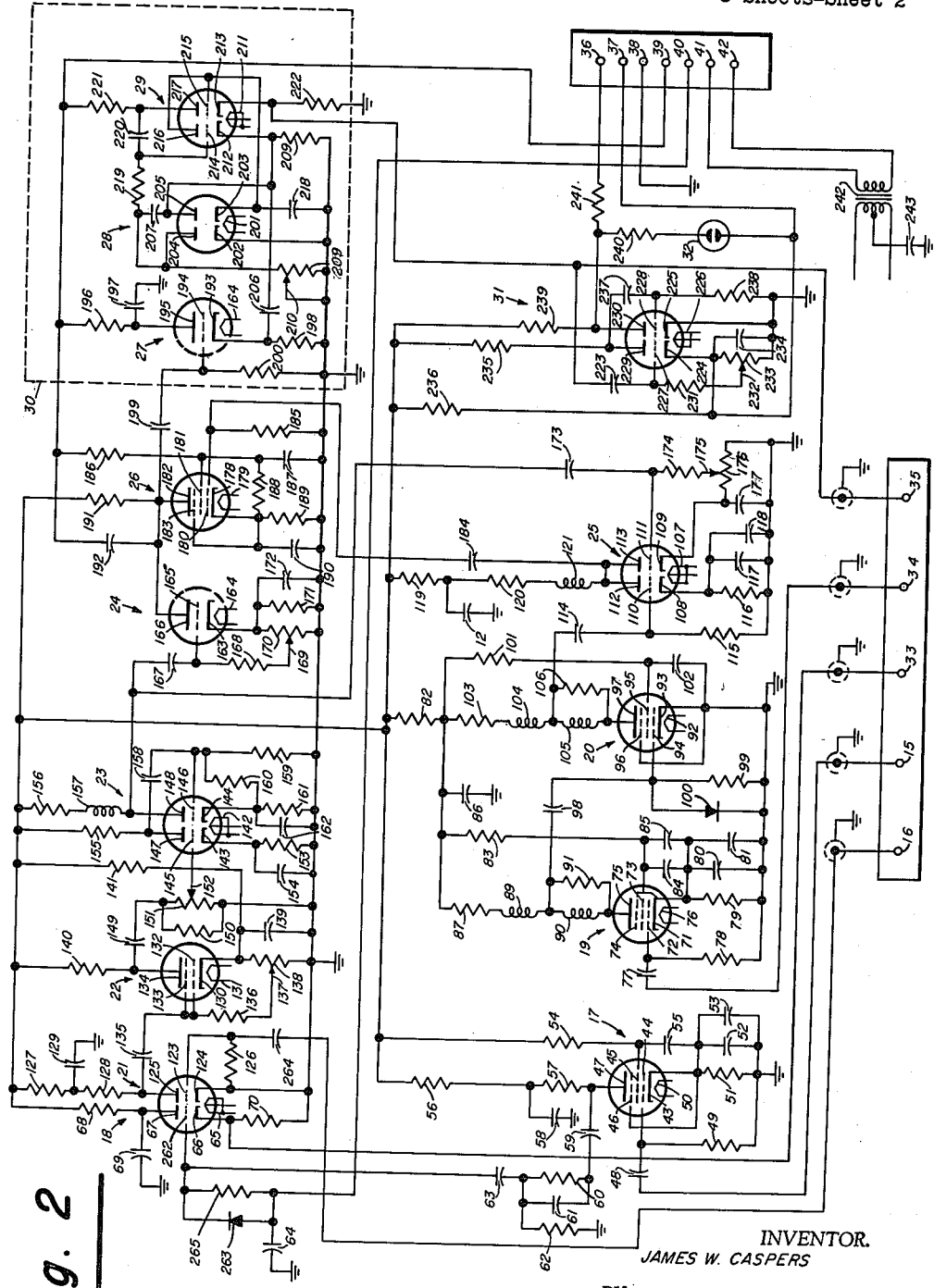
FIG. 2 is a schematic diagram of an illustrative embodiment of the demodulator unit.
Figure 5:
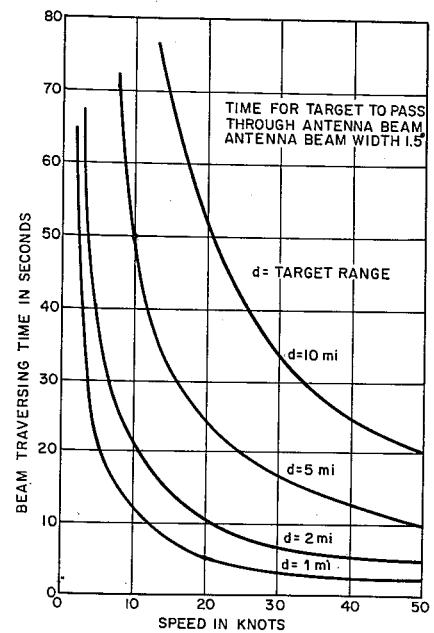
FIG. 5 is a schematic diagram of an alternative system for stretching gated video information.

FIG. 5 illustrates an alternative pulse stretcher which may be used in place of the one set forth in FIG. 2. In the embodiment of FIG. 5 the signal from plate 182 of the gated amplifier 26 would be coupled through the coupling capacitor 199 and thence to point 270. The signal would then pass through a four diode bridge consisting of diodes 271, 272, 273 and 274 connected in a close loop. The input signal would be connected to the common point of diodes 271 and 274 while a gate signal would be coupled to the input terminals 275 and 276 of a gating coil 277 which is connected across the leg of the loop comprising diodes 272 and 273 or diodes 271 and 274. The output signal would appear at the common junction of diodes 273 and 272. Connected to the common junction of diodes 272 and 273 is a second four diode bridge consisting of diodes 278, 279, 280 and 281 connected in a bridge configuration. The common point of diodes 278, 279 is connected to the common junction of diodes 272 and 273. The common junction of diodes 281 and 280 is connected to ground while the input gate is connected to the common point of diode 278, 281 and diode 279, 280 respectively. Also connected to the common point of diode 278, 281 and 279, 280 respectively, is a gating coil 282. Capacitor 283 is connected between the common point of diodes 279, 278 and ground. The stretched signal appears at the ungrounded side of capacitor 283 on terminal 284.

In the operation of the embodiment set forth in FIG. 5 the input signal from the plate 182 of gated amplifier 26 is coupled to terminal 270 and the diode bridge is gated on by a signal appearing between points 275 and 276, i.e., across gating coil 277. During this time the capacitor 283 is charged to the value of the input signal. At the termination of the signal the first gate is turned off and because the capacitor 283 is unable to discharge, the signal is stored and stretched. When it is desired to terminate the second diode bridge comprising diodes 278, 279, 280 and 281 is gated on by a signal appearing across the gating coil 282 and thus capacitor 283 is discharged and the signal is terminated.

Figure 3:
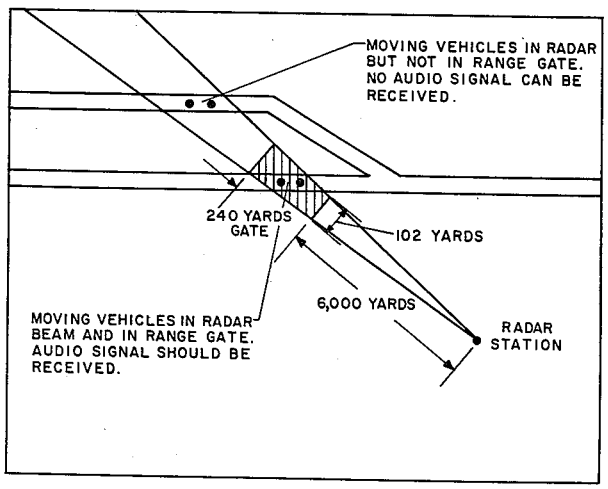
FIG. 3 is a schematic diagram of an operational set-up utilizing the present invention.

In the operation of the system the probable target range and bearing is an important consideration for determining the operation procedure. If the information is known precisely, as in the case of watching a road or railroad, the procedure is quite simple and most effective. This consists of homing the radar beam across the road or target path and setting the range gate to the range of the target path. Such a procedure is shown in FIG. 3 which is believed to be self-explanatory. However, if the exact position of suspected targets in the area regarded is not known, some method of guarding a large area which includes the entire target area must be used.

Guarding a large area would require that a large range segment as well as angular segment be watched. A large range segment may be guarded by either of two methods; (1) employ a gate wide enough to cover the entire range segment in question or (2) use a narrow gate and search the segment in question. A large angular segment may be guarded only by scanning the antenna across the target area because of the limitations on the radar antenna beam width. Hence, in order to thoroughly cover a large area, azimuth searching may be necessary in a range search or a wide gate must be used. Guarding a large area is thus seen to be fairly unwieldy and therefore, the problem of guarding a large area both in azimuth and range would generally be avoided if possible.

The radar beam should be located such that the moving targets to be detected must pass through the radar beam. This technique requires a prior knowledge of the direction of motion of the targets but eliminates the necessity of azimuth searching. Therefore, in such a technique only the question of range remains.

In the usual instance, the exact range of expected targets may not be known. Thus, some means of covering the entire range in question must be employed. As previously stated, therefore, either a gate wide enough to cover a wide range must be used, or a narrow gate may be used to search the range segment.

A wide gate has the distinct disadvantage of reducing the signal-to-noise ratio in that as the gate width is increased, the signal-to-noise ratio is reduced and is accompanied by an increasing difficulty in detecting the target by aural means. Furthermore, the weak targets for which the present system is most useful are the first ones to be missed. Although increasing the gate width increases the guard range element, the signal-to-noise ratio is reduced such that a gate width exceeding a certain value may impair the operation of the present system. This value is difficult to predetermine and would depend on the nature of the targets and the land clutter being observed.

A narrow gate about the same as the transmitted pulse width, results in a high signal-to-noise ratio. The narrow gate guards only a short range element but this sacrifice results in the high signal-to-noise ratio which is quite desirable. However, a searching action may be necessary in order to cover the entire range under observation.

Therefore, certain precautions must be undertaken in the range searching process when using the narrow gate. One precaution is that the range search must not be too fast. It has been determined that the range search must be slow enough so that the listening time for the gated range element exceeds ¼ second. If the audio note from a given target is present for less than ¼ second a serious equivalent loss in signal-to-noise ratio may result. Thus a minimum time of about 15 seconds should be used for searching a one mile section. However, operator experience indicates variations are possible from this rate.

Another precaution to be observed is that any range element should not be unguarded for too long a period or a target may pass through the beam at the unguarded range.

Figure 4:
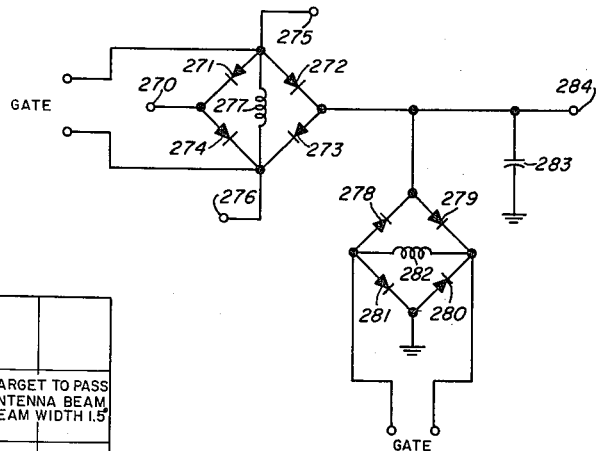
FIG. 4 is a graph wherein beam traversing time is plotted against the speed of a target.

FIG. 4 gives the time required for moving targets to pass through the radar beam at various speeds and ranges. For example, a target at a five mile range and a speed of 20 knots requires 25 seconds to pass through the radar beam. If the range search is great enough so that minimum search time exceeds 25 seconds a target may pass through the beam undetected. The maximum allowable search time may be derived from FIG. 4 for any nominal range target speed. The search time should not exceed the beam traversing time for the highest expected speed and may be reduced some to increase the probability of detection. However, these conditions limit the extent of range search for any given target speed and range conditions.

A further precaution is that the "A" scope of the radar set provides valuable clues as to the probable location of targets. Small targets in land clutter within the guarded region should be monitored. Areas of no return should not be monitored since valuable searching time will be wasted.

In addition the radar receiver must not be allowed to limit or saturate within the gated region. Receiver limiting removes the modulation from the video return and, thus, destroys the information being sought. However, limiting at ranges other than the gated range does not impair the operation of the present system and in fact in the normal operation of the system proper receiver gain for the gated range will often cause limiting at other ranges. The receiver gain may be controlled either manually during the searching operation or by the gated AGC of the radar system being used to provide the information.

It is apparent that the range gate may be adjusted at will, i.e., made narrow or wide depending on the extent of the area of interest. An extension of this technique would comprise doing away with the range gate entirely which would allow a low power surveillance of a wide area.

Thus, it is seen that the present invention translates the target returns and clutter modulation into a form useful to the operator. Therefore, even when the target becomes visually lost in the clutter its periodic modulation produces a tone which can be detected in the presence of the clutter noise and the aural detection technique enables a radar operator to detect targets which are undetectable by visual means. Furthermore, this improvement in target detection is accomplished without any modification of the existing radar system.

Additionally, as pointed out previously, the present system does not require the use of a coherent radar and thus, the requirement of discrimination filters, phase locking, very stable oscillators, and the attendant complicated circuitry and close tolerances are obviated.

It will be understood that various changes in details and materials, steps and arrangement of parts, which have been herein described and illustrated in order to explain the nature of the invention, may be made by those skilled in the art within the principle of the invention as expressed in the appended claims.

What is claimed is:

1. A gated video demodulator comprising: first input means for coupling a signal thereto corresponding to a range gate; second input means for coupling a signal thereto corresponding to received video information; signal mixing means operatively receiving said signal corresponding to said range and said signal corresponding to video information for mixing said video and range information; gated amplifier means having an input for generating an output signal corresponding to video information; input coupling means coupling the output signal containing video and range information from said mixing means to the input of said gated amplifier means for turning said gated amplifier on at a range corresponding to said range information and maintaining said gated amplifier on during said range interval amplifying said video information during said range interval; audio amplifier means operatively receiving the output video information from said gated amplifier means for amplifying said video information; and reproducing means operatively receiving the output of said audio amplifier for reproducing said audio information.

2. A gated video demodulator as set forth in claim 1 and further including filter means in said audio amplifier means for filtering out frequencies corresponding to pulse repetition frequencies and harmonics thereof.

3. A system for the aural detection of objects at a range comprising: an input terminal for coupling a range pulse thereto from a radio detection and ranging system; pulse generator means operatively receiving said range pulses for generating an output gate pulse, gate width adjusting means included in said pulse generator means for controlling the width of said output gate pulse; another input means for coupling video information from said radio detection and ranging system thereto; video amplifier means operatively receiving said video information for amplifying said video information; video gain control means operatively coupled to said video amplifier means for controlling overloading and limiting so that said video information is not distorted and destroyed; signal mixing means operatively receiving said gate pulse corresponding to a desired range and said video information for mixing said gate pulse and said video information and thereby generating in the output of said mixing means an output signal containing said gate pulse and said video information; gated amplifier means operatively receiving the output of said mixing means which is normally biased to cutoff so that said gated amplifier means conducts only when said pulse corresponding to range gates said amplifier on thereby generating at the output of said gated amplifier means a signal corresponding to video information within said range gate; audio amplifier means operatively coupled to said gated amplifier means and receiving the output thereof for amplifying said audio information contained in the output signal from said gated amplifier means; and reproducing means operatively coupled to said audio amplifier means for reproducing said audio information obtained from said audio amplifier means.

4. An aural detection system as set forth in claim 3 and further including an overload indicator operatively coupled to the output of said gated amplifying means for indicating when said system is overloaded and said video signal is being limited and the information contained therein being removed.

5. An aural detection system as set forth in claim 3 and further including pulse stretching means between the output of said gated amplifier means and the input to said audio amplifier means for stretching the output pulse from said gated amplifier means thereby resulting in a higher average power output and a detection of audio information in the output pulse from said gated amplifier means.

6. An aural detection system as set forth in claim 3 and further including integrating means operatively coupled to the output of said gated amplifier means for averaging the output video from said gated amplifier means so that small signals will not be masked by possible larger signals.

7. An aural detection system as set forth in claim 3 and further including bucking amplifier means operatively receiving output gate pulses from said pulse generator means; and coupling means operatively coupling said bucking amplifier to said gated amplifier means for removing said range pulse from the output of said gated amplifier means.

8. An aural detection system as set forth in claim 5 wherein said pulse stretching means comprises a gated bridge network.

9. An aural detection system as set forth in claim 5 and further including low-pass filters in said audio amplifier means for filtering out pulse repetition frequencies and harmonics thereof.

References Cited in the file of this patent

UNITED STATES PATENTS

| | | |
|---|---|---|
| 2,491,542 | Woodyard | Dec. 20, 1949 |
| 2,760,189 | McCoy | Aug. 21, 1956 |